US007363873B2

(12) United States Patent
Iteya et al.

(10) Patent No.: US 7,363,873 B2
(45) Date of Patent: Apr. 29, 2008

(54) BICYCLE SHIFT CONTROL DEVICE WITH LIGHT STRUCTURE

(75) Inventors: Yoshihide Iteya, Izumisano (JP); Naoya Tokumoto, Sakai (JP); Kua Wei Hock, Pine Close (SG)

(73) Assignees: Shimano Inc., Osaka (JP); Shimano (Singapore) Pte., Ltd., Jurong Town (SG)

( * ) Notice: Subject to any disclaimer, the term of this patent is extended or adjusted under 35 U.S.C. 154(b) by 114 days.

(21) Appl. No.: 11/357,336

(22) Filed: Feb. 21, 2006

(65) Prior Publication Data

US 2007/0193497 A1   Aug. 23, 2007

(51) Int. Cl.
*B62J 6/02* (2006.01)
*B62K 23/02* (2006.01)

(52) U.S. Cl. .............................. 116/28.1; 116/DIG. 5; 362/473; 340/432; 74/502.2

(58) Field of Classification Search ............... 116/28.1, 116/DIG. 5, DIG. 20; 362/23, 26, 29, 30, 362/473, 474; 340/432; 74/502.2, 489
See application file for complete search history.

(56) References Cited

U.S. PATENT DOCUMENTS

| 2,454,732 | A |   | 11/1948 | Cathey et al. |
| 3,524,979 | A | * | 8/1970  | Cohen ......................... 362/473 |
| 4,687,072 | A | * | 8/1987  | Komuro ....................... 180/219 |
| 5,178,033 | A | * | 1/1993  | Kund ........................ 74/501.5 R |
| 5,555,161 | A | * | 9/1996  | Roe et al. ..................... 362/555 |
| 5,903,214 | A | * | 5/1999  | Watarai ....................... 340/432 |
| 6,109,770 | A | * | 8/2000  | Choimet et al. ............ 362/473 |
| 6,199,446 | B1 |   | 3/2001  | Ose |
| 6,204,752 | B1 |   | 3/2001  | Kishimoto |
| 6,569,045 | B1 |   | 5/2003  | Campagnolo |
| 6,588,297 | B1 | * | 7/2003  | Day et al. ................... 74/551.8 |
| 6,695,090 | B2 | * | 2/2004  | McAllister .................. 180/333 |
| 6,974,222 | B2 | * | 12/2005 | Mascadri et al. ............. 362/85 |
| 7,192,169 | B2 | * | 3/2007  | Takeda ....................... 362/475 |
| 2004/0036585 | A1 | * | 2/2004  | Kitamura et al. ........... 340/432 |
| 2004/0105273 | A1 |   | 6/2004  | Takeda |
| 2004/0139816 | A1 |   | 7/2004  | Takachi |
| 2004/0190302 | A1 | * | 9/2004  | Mascadri et al. ........... 362/474 |
| 2005/0241429 | A1 |   | 11/2005 | Kawakami |
| 2007/0014120 | A1 | * | 1/2007  | Kitamura .................... 362/473 |

FOREIGN PATENT DOCUMENTS

| DE | 101 47 283 A1 | 4/2003 |
| EP | 0 744 334 A2 | 11/1996 |
| EP | 1 270 397 A2 | 1/2003 |
| JP | 07291165 A * | 11/1995 |
| WO | WO-2005/035345 A | 4/2005 |

* cited by examiner

*Primary Examiner*—R. A. Smith
*Assistant Examiner*—Amy Cohen Johnson
(74) *Attorney, Agent, or Firm*—Global IP Counselors, LLP

(57) ABSTRACT

A bicycle shift control device includes a shifter housing, a shift control mechanism and a bicycle light structure. The shift control mechanism is coupled to the shifter housing. The shift control mechanism is configured and arranged to control a bicycle transmission component. The bicycle light structure is coupled to the shifter housing. The bicycle light structure includes a bicycle location light that is arranged and configured to project light outwardly from the shifter housing at a location remote from a gear position indicator. Preferably, the bicycle light structure is also configured and arranged to illuminate the gear position indicator at a location remote from the light projecting outwardly from the shifter housing.

16 Claims, 8 Drawing Sheets

BICYCLE SHIFT CONTROL DEVICE WITH LIGHT STRUCTURE

BACKGROUND OF THE INVENTION

1. Field of the Invention

This invention generally relates to a bicycle shift control device with a light structure. More specifically, the present invention relates to a bicycle shift control device with a light structure, which provides illumination for a gear position indicator as well as illumination for night time visibility.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the bicycle. In particular, the bicycle industry is constantly improving overall performance of the bicycle as well as user friendliness and overall safety.

Typically bicycles have been provided with reflectors at various locations such that the bicycle is visible to automotive vehicles at night. These reflectors are strategically placed at various locations on the bicycle such as in front, in back, on the pedals and on the wheels so as to reflect light in a variety of directions. Thus, bicycles with reflectors can typically be seen by automotive vehicles at night. However, more recently, some bicycles have been provided with electrically powered lights for riders that often ride at night.

When electric lights are provided on the bicycle, the lights are usually powered by an electric generator mounted to a movable part of the bicycle (e.g., one of the wheels) and/or a battery. These lights can be set to flash intermittently or for continuous illumination. For examples, riders often use a rear red light that optionally flashes and a front white light that is illuminated continuously. This is a similar design to automotive vehicle lights. The front light typically serves to illuminate the road in front of the rider as well as to notify automotive vehicles of the presence and location of the front of the bicycle. The rear light typically serves to notify automotive vehicles of the presence and location of the rear of the bicycle. The front and rear lights together serve to notify automotive vehicles of the orientation and moving direction of the bicycle.

While these prior systems of reflectors and/or lights generally work well and make bicycles relatively safe for riding at night, they suffer from deficiencies. In particular, these prior systems can be relatively large, heavy and/or cumbersome. Moreover, these prior systems can be relatively unattractive aesthetically. Furthermore, these prior systems can be relatively expensive and/or difficult and complicated to install. Thus, these prior systems of reflectors can be impractical for some riders. Also, some riders rarely if ever ride at night. These riders may believe reflectors and/or lights are not needed, and thus, remove such items from their bicycles. Removing reflectors from the bicycle reduces visibility of the bicycle to other vehicles if the bicycle is ridden at night. Even if the rider does not plan to ride at night, a situation could arise when the bicycle needs to be ridden at night.

Moreover, when riding a bicycle at night, it can be very difficult for the rider to view a display and/or gear position indicators. Some bicycle computers have display members or panels that include a light for illuminating the display panel or member during nighttime hours. Usually, the rider pushes a button that activates the light. Once the rider releases the button, the light is extinguished. One disadvantage of this type of arrangement is that the rider must perform a separate function in order to view the information on the display. Moreover, the lights are typically inefficient and cause a significant drain on the battery life. Furthermore, these buttons can be accidentally hit during daylight hours in which the battery is needlessly used. Gear indicators and especially mechanical gear indicators typically are absent any lighting whatsoever making them virtually impossible to see at night.

In view of the above, it will be apparent to those skilled in the art from this disclosure that there exists a need for an improved bicycle shift control device with a light structure. This invention addresses this need in the art as well as other needs, which will become apparent to those skilled in the art from this disclosure.

SUMMARY OF THE INVENTION

One object of the present invention is to provide a bicycle shift control device with a light structure, which provides a location or position light (e.g. a visibility light) for the bicycle that is visible to other vehicles at night.

Another object of the present invention is to provide a bicycle shift control device with a light structure, which provides illumination of a gear position indicator when riding at night.

Yet another object of the present invention is to provide a bicycle shift control device with a light structure, which can be provided on a bicycle in an integrated, aesthetically pleasing manner.

Yet still another object of the present invention is to provide a bicycle shift control device with a light structure, which is relatively simple and inexpensive to manufacture, assemble and install.

The foregoing objects can basically be attained by providing a bicycle shift control device with light structure, which includes a shifter housing, a shift control mechanism and a bicycle light structure. The shift control mechanism is coupled to the shifter housing. The shift control mechanism is configured and arranged to control a bicycle transmission component. The bicycle light structure is coupled to the shifter housing. The bicycle light structure includes a bicycle location light that is arranged and configured to project light outwardly from the shifter housing at a location remote from a gear position indicator.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF A PREFERRED EMBODIMENT

A selected embodiment of the present invention will now be explained with reference to the drawings. It will be apparent to those skilled in the art from this disclosure that the following descriptions of the embodiment of the present invention are provided for illustration only and not for the purpose of limiting the invention as defined by the appended claims and their equivalents.

Figure 1:
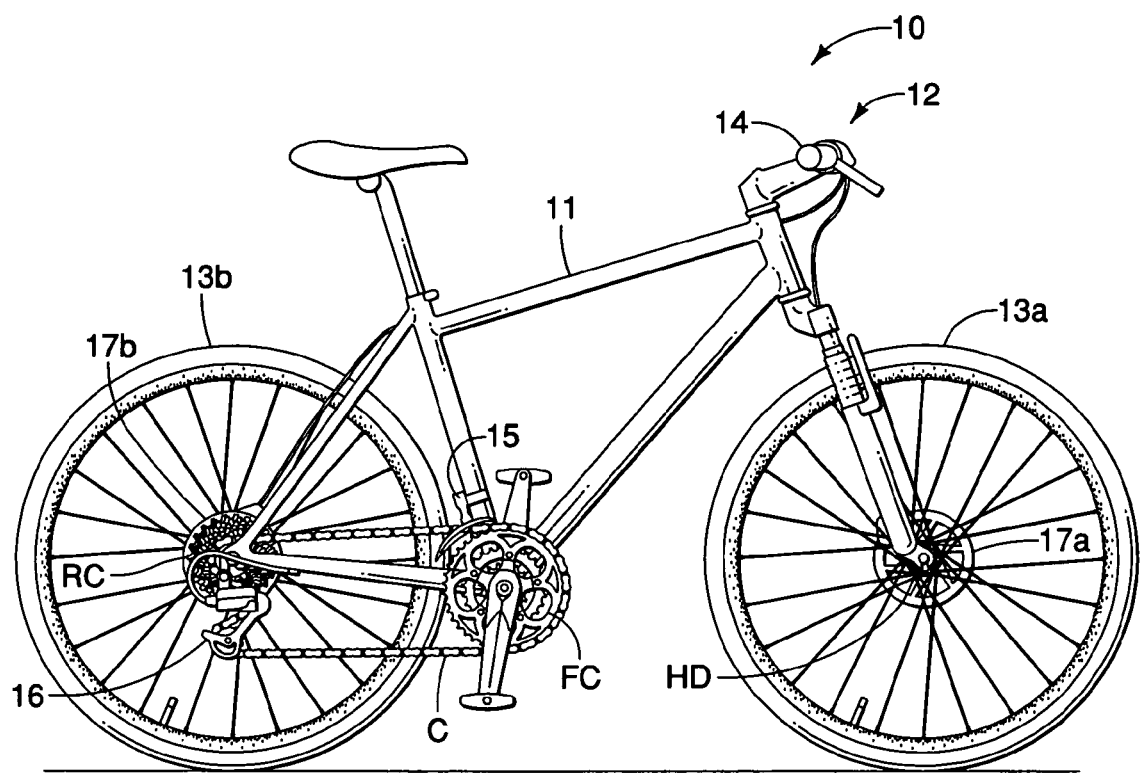
FIG. 1 is a side elevational view of a bicycle equipped with a shift control device with light structure in accordance with the present invention.

Referring initially to FIG. 1, a bicycle 10 having a shift control device 12 in accordance with a first embodiment of the present invention is illustrated. The shift control device 12 is provided with a light structure 24 that is arranged and configured to project a beam of light away from the bicycle 10 (i.e., in a substantially forward direction) in accordance with the present invention. The light structure 24 is also configured and arranged to illuminate a gear position indicator 26 of the shift control device 12 at a location remote from the beam of light projected away from the bicycle 10 in accordance with the present invention.

Bicycles such as the bicycle 10 and their various components are well known in the art. Thus, the bicycle 10 includes a conventional frame 11 with a pivotal front fork as well as various conventional bicycle components such as front and rear wheels 13a and 13b, a front derailleur 15, a rear derailleur 16, a front crank set FC, a rear cassette RC with a freewheel (not shown), a chain C, front and rear disc brakes 17a and 17b, pedals, a seat and other conventional components coupled to the frame 11 in a conventional manner. The bicycle 10 and its various components will not be discussed and/or illustrated in detail herein, except as related to the present invention. In other words, only the shift control device 12 and the components of the bicycle 10 that relate to the shift control device 12 of the present invention will be discussed and/or illustrated in detail herein.

Figure 2:
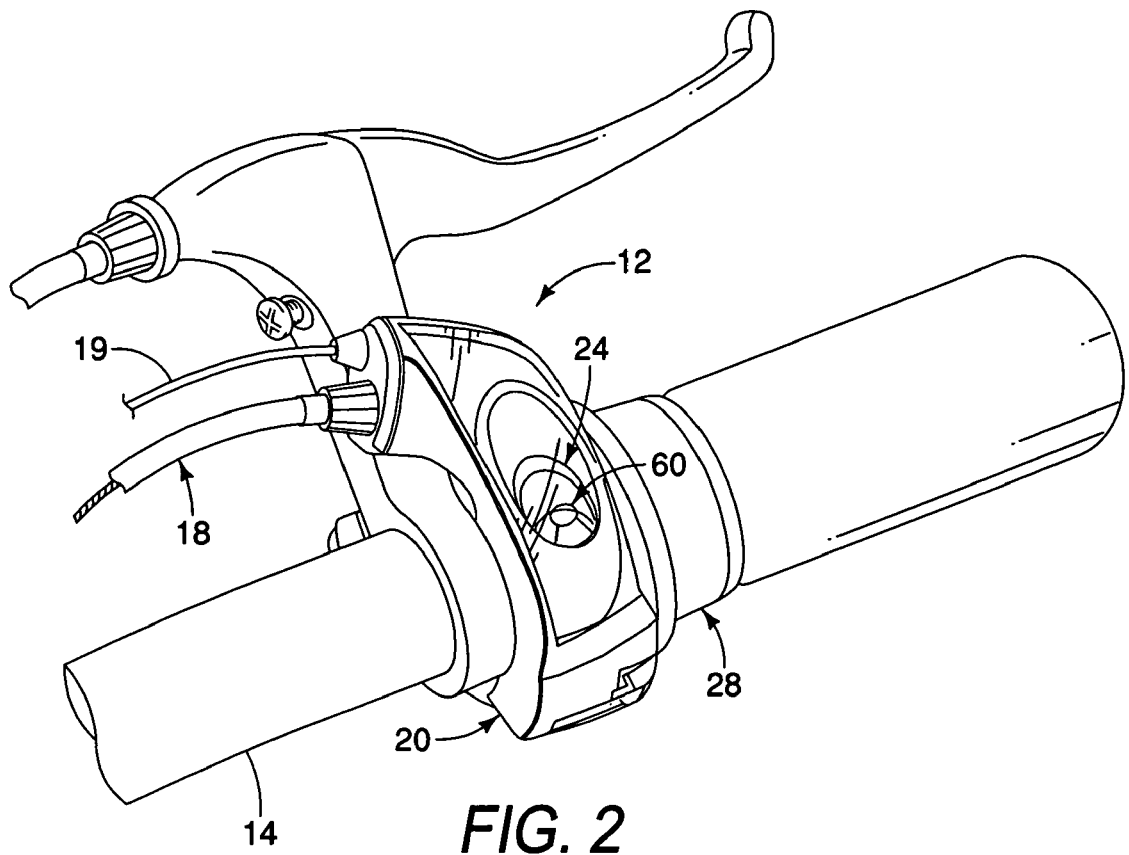
FIG. 2 is an enlarged perspective view of the shift control device with light structure illustrated in FIG. 1.

Referring now to FIGS. 1 and 2, the shift control device 12 is attached to the handlebar 14 of the bicycle 10 in a conventional manner. The handlebar 14 is attached to the front fork of the frame 11 in a conventional manner. The shift control device 12 is operatively coupled to the rear derailleur 16 (i.e., a bicycle transmission component) via a shift control cable 18 to control movement of the rear derailleur 16 in a conventional manner. At least one of the wheels 13a and 13b preferably includes a conventional hub generator in order to generate electrical current to power the light structure 24 of the shift control device 12 of the present invention. Specifically, the front wheel 13a preferably includes a conventional hub dynamo HD that generates electrical current during rotation of the front wheel 13a. The hub dynamo HD is electrically coupled to the light structure 24 via an electrical cord 19, as explained below in more detail.

It will be apparent to those skilled in the art from this disclosure that various modifications can be made to the bicycle 10 and its conventional components without departing from the present invention if needed and/or desired. In other words, it will be apparent to those skilled in the art from this disclosure that the shift control device 12 in accordance with the present invention can be used in conjunction with a variety of conventional bicycle components as well as on a variety of different types of bicycles if needed and/or desired. For example, it will be apparent to those skilled in the art from this disclosure that the light structure 24 of the shift control device 12 of the present invention can be powered by any conventional electrical power supply (e.g., a battery and/or an alternate generator or the like) that is suitable for use on a bicycle if needed and/or desired.

Referring now to FIGS. 1-5, the shift control device 12 basically includes a shifter housing 20, a shift control mechanism 22, the light structure 24, the gear position indicator 26 and a user operating member 28. The shifter housing 20 is fixedly mounted on the handlebar 14 in a conventional manner. The shift control mechanism 22 and the gear position indicator 26 are movably supported between the shifter housing 20 and the user operating member 28. The light structure 24 is non-movably mounted to the shifter housing 20 in accordance with the present invention. The user operating member 28 is movably supported relative to the shifter housing 20.

The shift control mechanism 22 is partially located within the shifter housing 20 and the user operating member 28. The shift control mechanism 22 is operatively coupled to the user operating member 28 to move in response to movement of the user operating member 28. The gear position indicator 26 is located within the shifter housing 20. The gear position indicator 26 is configured and arranged to move relative to the shifter housing 20 in response to movement of the shift control mechanism 22. Thus, the gear position indicator 26 is configured and arranged to move in response to movement of the user operating member 28. Accordingly, the shift control mechanism 22 and the gear position indicator 26 are both operated to move in response to movement of the user operating member 28 in a conventional manner.

Figure 14:
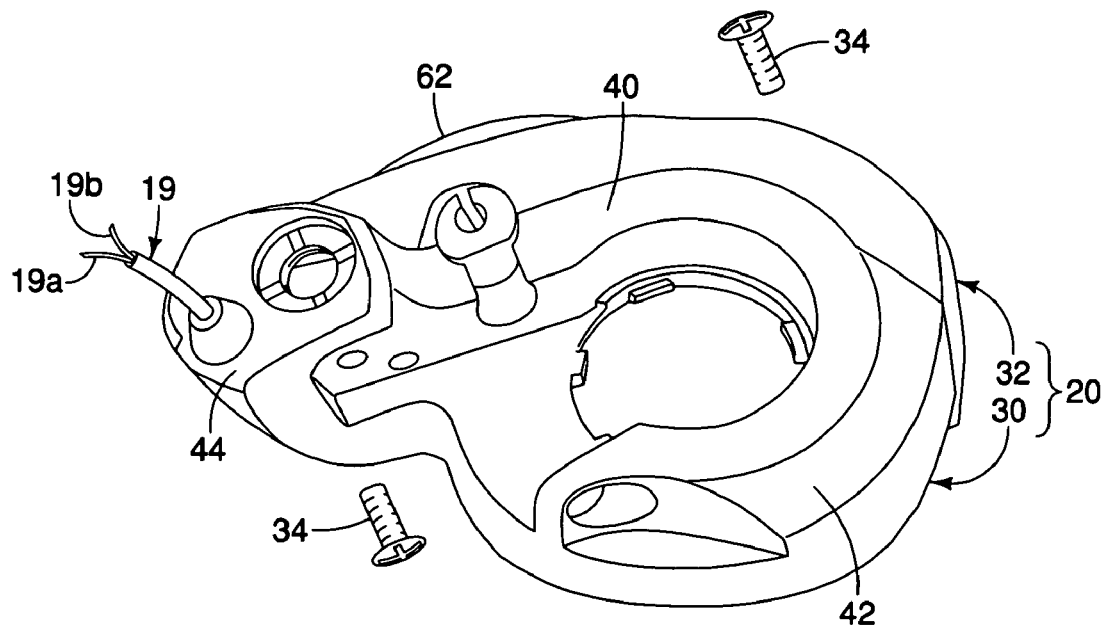
FIG. 14 is a lower/side perspective view of the assembled structure of FIG. 13 partially coupled to the base member or mounting bracket of the shift control device.

Referring now to FIGS. 3-14, the shifter housing 20 basically includes a base member or mounting bracket 30 and a cover member 32. The cover member 32 is non-movably attached to the base member 30 using a pair of fasteners 34 (e.g., screws), as best seen in FIG. 14. Preferably, the base member 30 and the cover member 32 are each constructed as a one-piece, unitary member from a light weight rigid material such as a hard plastic using injection molding, casting or any other conventional manufacturing technique. The shift control mechanism 22 and the gear position indicator 26 are preferably rotatably supported to extend partially into the shifter housing 20 between the base member 30 and the cover member 32, as explained below in more detail.

Figure 4:
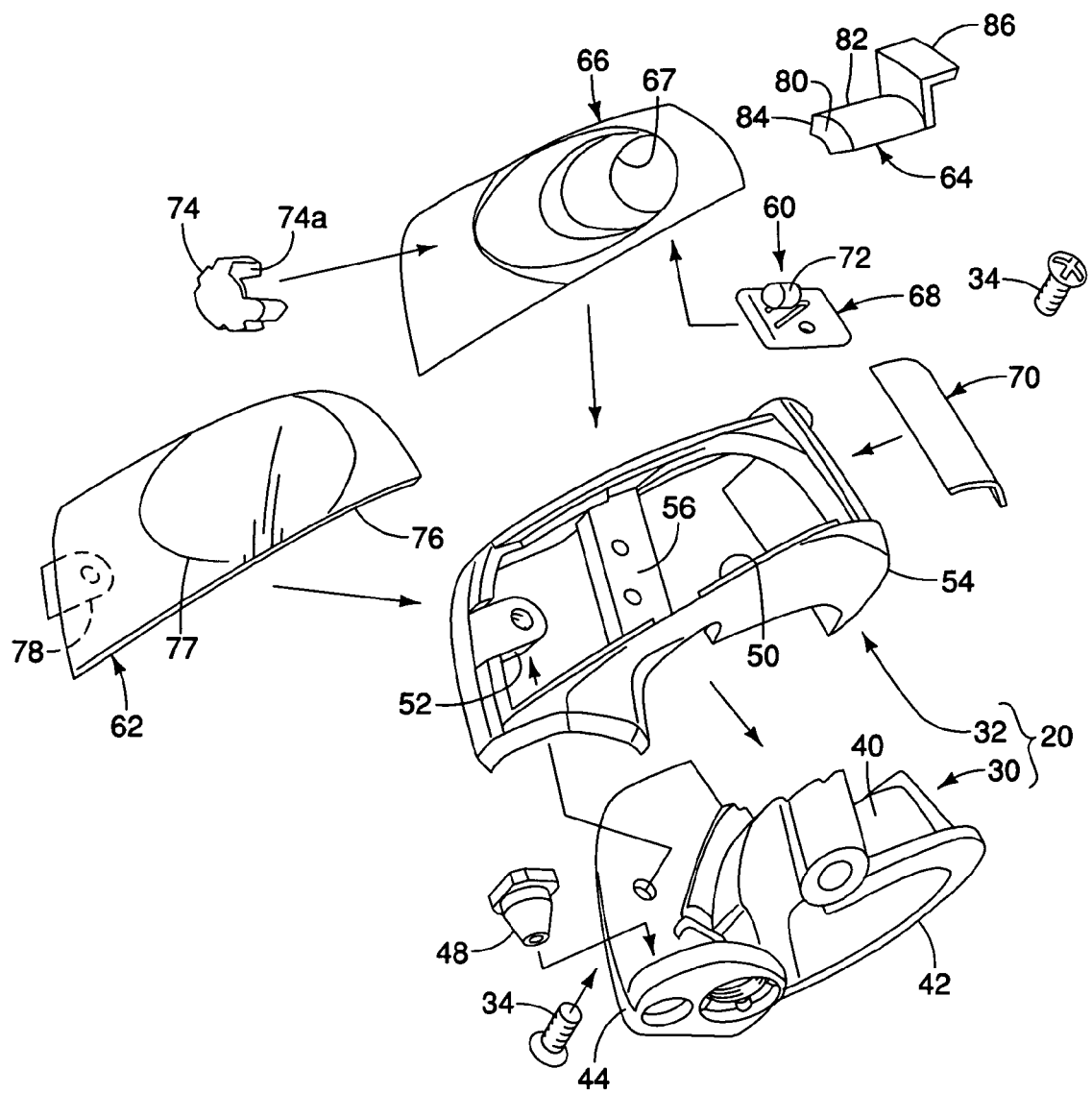
FIG. 4 is an exploded perspective view of the shift control device with light structure illustrated in FIG. 2.
Figure 5:
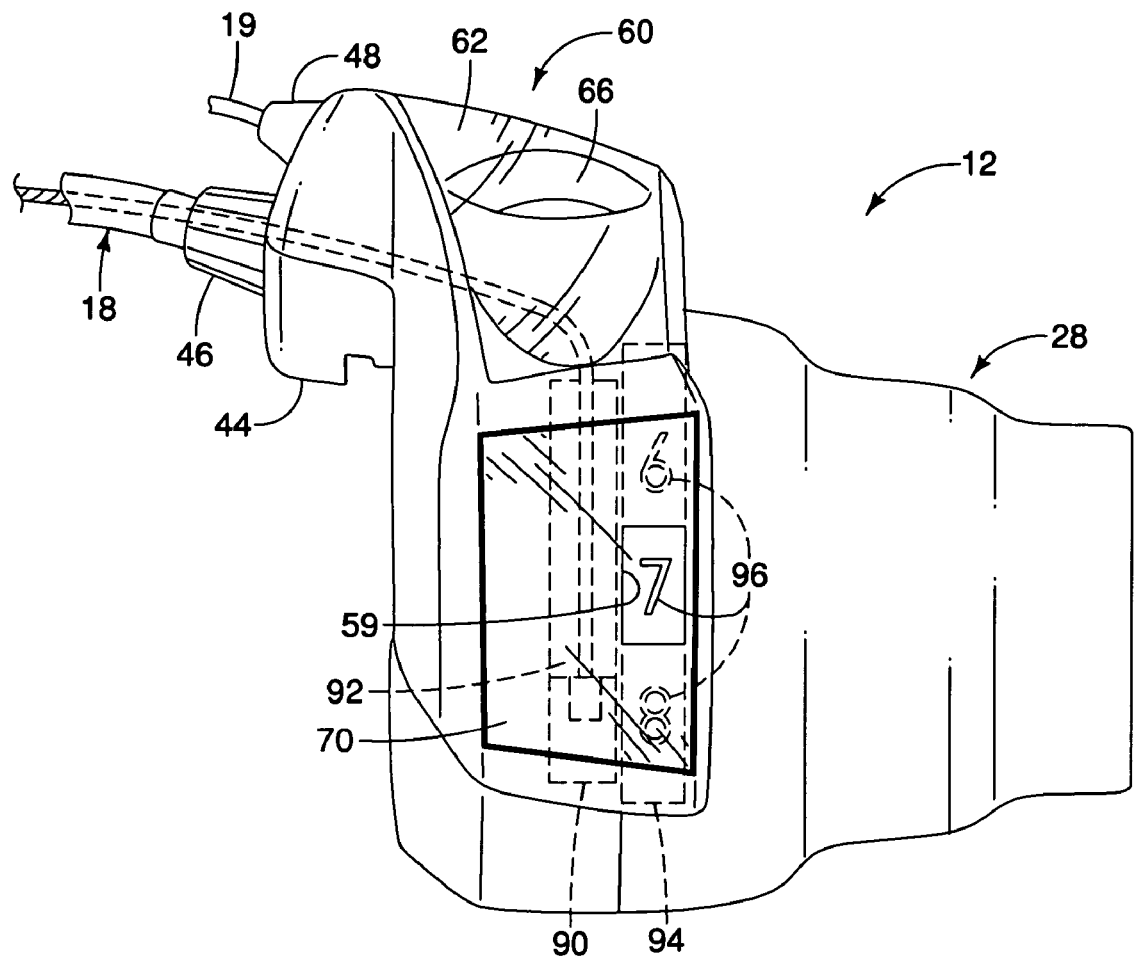
FIG. 5 is an enlarged, top plan view of the shift control device with light structure illustrated in FIGS. 2-4.
Figure 6:
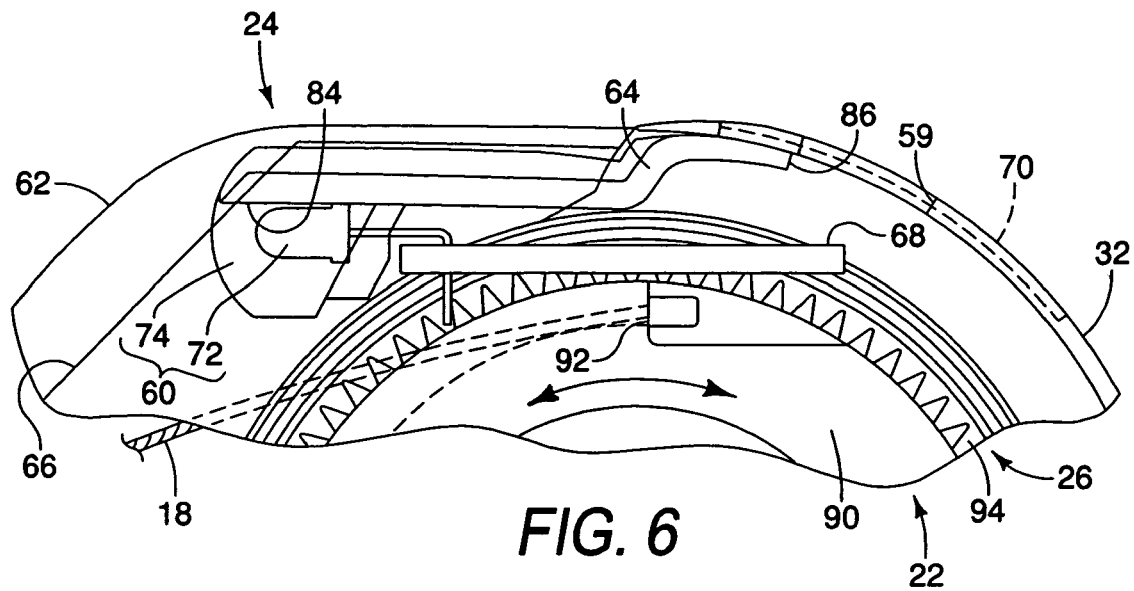
FIG. 6 is a partial cross-sectional view of the shift control device with light structure illustrated in FIGS. 2-5 as seen along section line 6-6 of FIG. 5.

As best seen in FIGS. 4 and 14, the base member 30 basically includes a main support portion 40, a tubular clamping portion 42 and a cable guide portion 44. The support portion 40 is configured and arranged to support the shift control mechanism 22 and the gear position indicator 26. The tubular clamping portion 42 is basically a C-shaped portion that is non-movably clamped onto the handlebar 14 by tightening a fastener (such as a bolt, not shown) between the free ends in a conventional manner. Preferably, the tubular clamping portion 42 is used to fixedly attach the shift control device 12 to the handlebar 14 after the shift control device 12 is completely assembled. Preferably, the tubular clamping portion may include a separate metallic clamping insert (not shown) in a manner similar to U.S. Patent Publication No. 2004/0139816. Such a clamping insert would be received in the recessed area of the tubular clamping portion 42 illustrated in FIG. 14, if desired. The use of such inserts is well known in the bicycle art.

Figure 3:
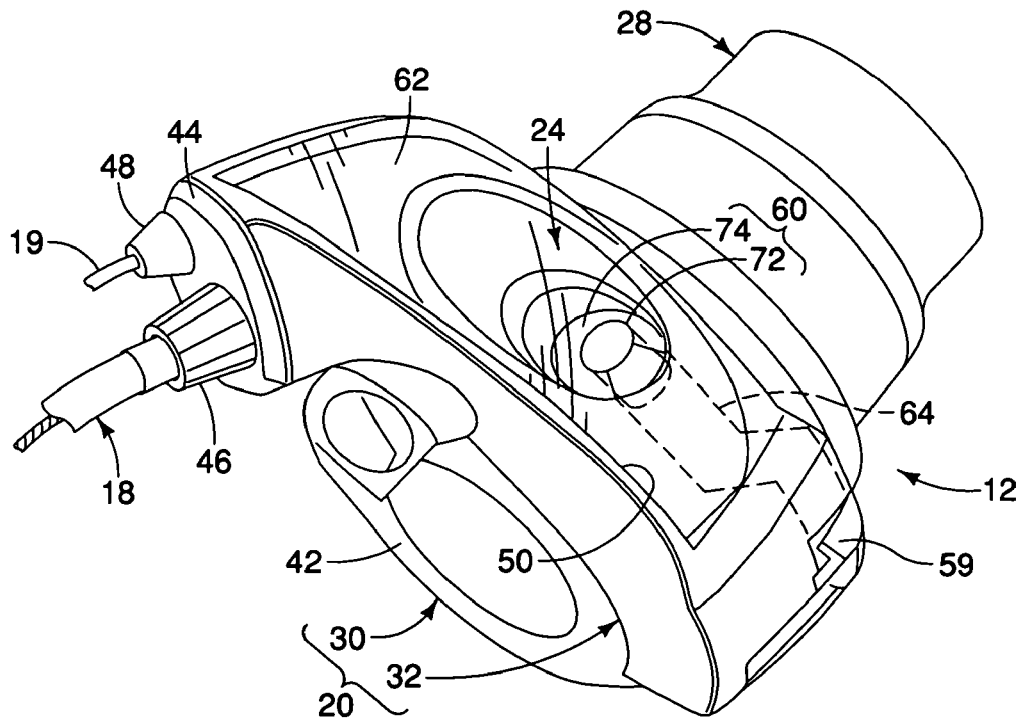
FIG. 3 is an enlarged, exploded perspective view of the shift control device with light structure illustrated in FIG. 2.

As best seen in FIGS. 3 and 4, the cable guide portion 44 has a stepped threaded through opening with a conventional barrel adjuster 46 mounted therein to guide the shift control cable 18 out of the shifter housing 20. The barrel adjuster 46 serves to adjust the effective length of the shift control cable 18 in a conventional manner. The cable guide portion 44 also preferably includes an unthreaded through bore configured to receive a wire guide member or grommet 48 therein, as best seen in FIGS. 3 and 4. The wire guide member 48 is preferably constructed of rubber, resilient plastic or the like. The wire guide member 48 preferably has a through hole with the electrical cord 19 extending therethrough. The guide member 48 servers to not only guide the electrical cord 19 toward the light structure 24, but also to prevent contaminants (e.g., water and/or dirt) from entering the interior of the shifter housing 20 at the cable guide portion 44.

Referring still to FIGS. 3-14, the cover member 32 is configured and arranged to have the light structure 24 mounted thereto. The cover member 32 is also configured and arranged to overlie or cover the gear position indicator 26 and to partially overlie or cover the shift control mechanism 22. Preferably, the light structure 24 is mounted to the cover member 32 before the cover member 32 is attached to the base member 30 using the fasteners 34. The cover member 32 basically includes a mounting opening 50, a front or first main attachment portion 52, a rear or second main attachment portion 54, a reflector attachment portion 56, a circuit board attachment portion 58 and an indicator viewing opening 59 as best seen in FIGS. 3, 4 and 8-11.

The mounting opening 50 is configured and arranged to have the light structure partially mounted therein. Specifically, the mounting opening 50, the front attachment portion 52, the reflector attachment portion 56 and the circuit board attachment portion 58 cooperate to secure various parts of the light structure 24 thereto in order to secure the light structure 24 partially within the mounting opening 50 of the cover member 32, as explained below. Some parts of the light structure 24 are mounted to an upper side of the cover member 32, while other parts of the light structure 24 are mounted to a lower side of the cover member 32, as also explained below.

The mounting opening 50 is configured and arranged to slidably receive part of the light structure 24 therein. The reflector attachment portion 56 basically includes a plate that extends across the mounting opening 50, which has two small through holes formed therein in order to ultrasonically weld part of the light structure 24 thereto. The circuit board attachment portion 58 basically includes a projection with a threaded blind bore formed therein in order to mount part of the light structure 24 thereto. The mounting opening 50, the front attachment portion 52, the reflector attachment portion 56 and the circuit board attachment portion 58 will be explained in more detail below.

The front main mounting portion 52 is preferably a flange with a threaded through opening formed therein that is configured and arranged to be aligned with a through opening of the base member 30 to receive one of the fasteners 34 in order to couple the front of the cover member 32 to the base member 30 and in order to secure part of the light structure 24 to the cover member 32. The rear main attachment portion 54 basically includes a through bore that is configured and arranged to be aligned with a threaded opening (not shown) of the base member 30 to receive the other of the fasteners 34 in order to couple the rear of the cover member 32 to the base member 30 as best understood from FIG. 14. The indicator viewing opening 59 is aligned with the gear position indicator 26 when the shift control device 12 is completely assembled such that the gear position indicator 26 can be viewed through indicator viewing opening 59 by the rider. Thus, the area surrounding the indicator viewing opening 59 can be considered an indicator body with the indicator viewing opening 59 formed therein.

Referring still to FIGS. 3-14, the light structure 24 basically includes a bicycle location or position light 60, a transparent cover lens 62, a light guide 64, a reflector 66, a printed circuit board 68 and an indicator lens 70. The light structure 24 is preferably electrically coupled to the front hub dynamo HD of the front wheel 13a via the electrical cord 19, as mentioned above. With this arrangement, the light structure 24 is supplied with electrical power whenever the bicycle 10 is being ridden (i.e., whenever the front wheel 13a is rotating). Thus, the light structure 24 provides a location or position light whenever the bicycle 10 is being ridden at night.

The reflector 66 is fixedly attached to the reflector attachment portion 56 within the mounting opening 50. The location light 60 is attached to the printed circuit board 68. The printed circuit board 68 is attached to the cover member 32. The location light 60 is preferably attached to the printed circuit board 68 prior to attaching the printed circuit board 68 to the cover member 32. The cover lens 62 is slidably attached within the mounting opening 50 to overlie the reflector 66. Thus, the cover lens 62 is preferably attached to the cover member 32 after the reflector 66 is attached to the cover member 32. The light guide 64 is attached to an internal surface of the cover member 32. The light guide 64 is further held in place by the printed circuit board 68 and by a friction fit between a portion of the location light 60, the light guide 64 and the reflector 66, as explained below. Of course, the light guide 64 can also be adhesively attached to the internal surface of the cover member 32 as needed and/or desired. The light guide 64 is preferably attached to the cover member 32 prior to attaching the printed circuit board 68 and location light 60 to the cover member 32.

The bicycle location light 60 basically includes an LED (light emitting diode) 72 and an LED lens 74. The LED 72 is preferably a high light output LED that projects white light. LEDs such as the LED 72 are well known. The LED 72 preferably has a substantially cylindrical shape. The LED 72 is electrically coupled to the printed circuit board 68, preferably by soldering. The LED 72 has rigid electrical leads extending therefrom that are preferably soldered to the printed circuit board 68. Thus, the LED 72 is also mechanically, rigidly coupled to the printed circuit board 68.

The LED lens 74 is a cup shaped member that surrounds a majority of the LED 72. The LED lens 74 has a cutout 74*a* configured and arranged to receive one end of the light guide 64 to surround the remainder of the LED 72. Thus, some of the light projected from the LED 72 enters the light guide 64. In other words, the LED 72 is arranged and configured to project light both outwardly from the shifter housing 20 and internally toward the light guide 64. However, a majority of the light projected by the LED 72 is preferably projected outwardly of the shifter housing 20 as a diffused beam of light in front of the bicycle 10 due to the LED lens 74 extending around a majority of the LED 72, and due to the configuration of the reflector 66 explained below. The LED 72 is arranged and configured to project light outwardly from the shifter housing 20 in the location remote from the gear position indicator 26, and to project some light internally toward the gear position indicator 26.

The cover lens 62 basically has a rectangular shaped configuration. The cover lens 62 includes a peripheral attachment surface 76 and a mounting flange 78. As seen in FIG. 4, the cover lens 62 is preferably constructed of a transparent plastic material. The cover lens 62 has an undulating, curved shape with a bulbous center portion 77. The LED lens 74 and the reflector 66 are preferably configured and arranged to primarily project the light front the LED through the bulbous center portion 77 as a diffused beam of light. The peripheral attachment surface 76 cooperates with the mounting opening 50 such that the cover lens 62 can be slid into the mounting opening 50 from the front. The mounting flange 78 is slid in between the reflector 66 and the front main attachment portion 52. The mounting flange 78 has a through hole formed therein to receive the end of the front fastener 34, as best understood from FIG. 13. The cover lens 62 preferably substantially seals the mounting opening 50 to prevent contaminants such as water and dirt from entering the interior of the shifter housing 20. The transparent cover lens 62 covers the reflector 66 and the LED 72.

Figure 7:
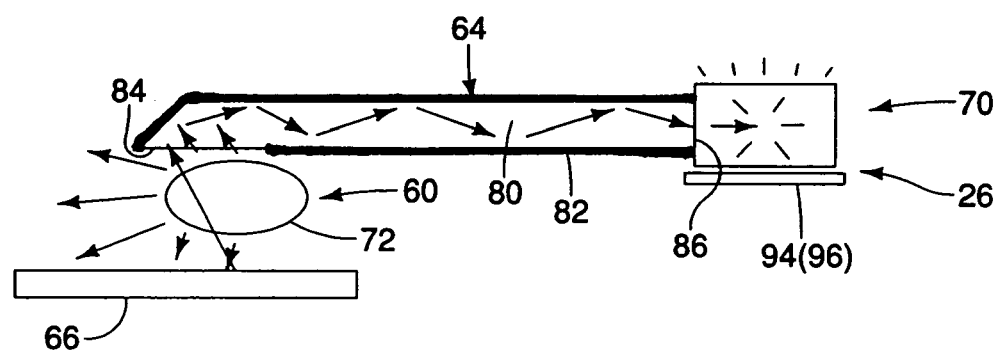
FIG. 7 is a diagrammatic cross-sectional view of the light structure of the shift control device illustrated in FIGS. 2-6.
Figure 8:
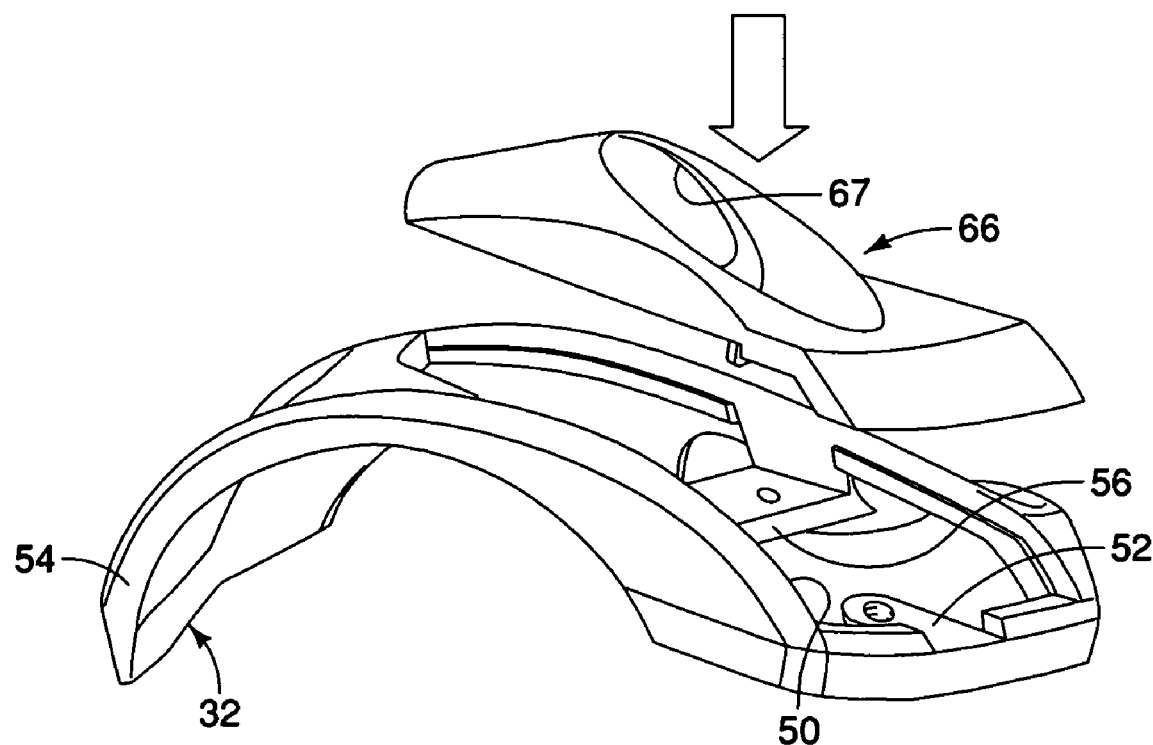
FIG. 8 is an enlarged, exploded upper/side perspective view of the cover member and reflector of the shift control device with light structure illustrated in FIGS. 2-6.
Figure 9:
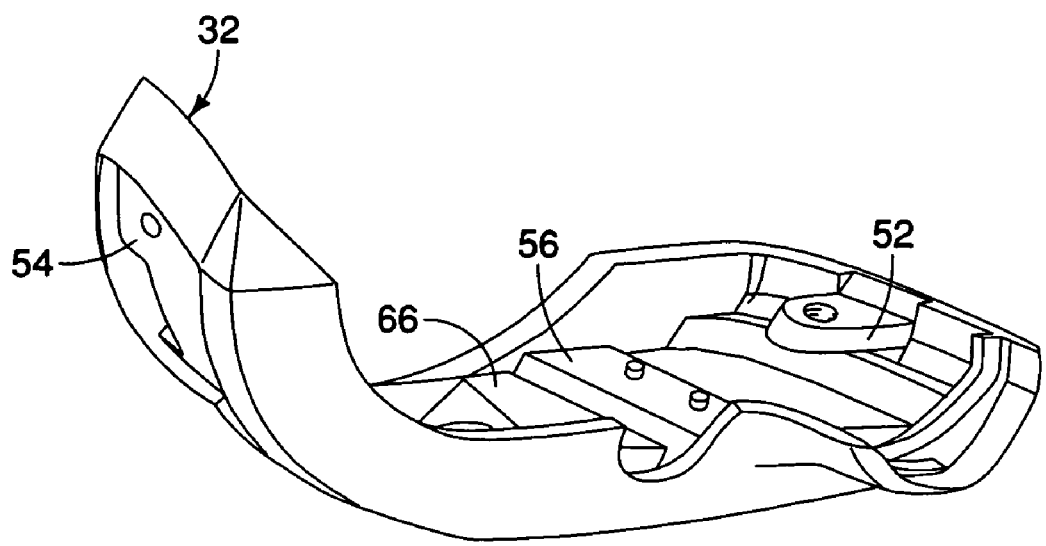
FIG. 9 is a lower/side perspective view of the cover member and reflector of the shift control device with light structure illustrated in FIG. 8 after partial assembly.
Figure 10:
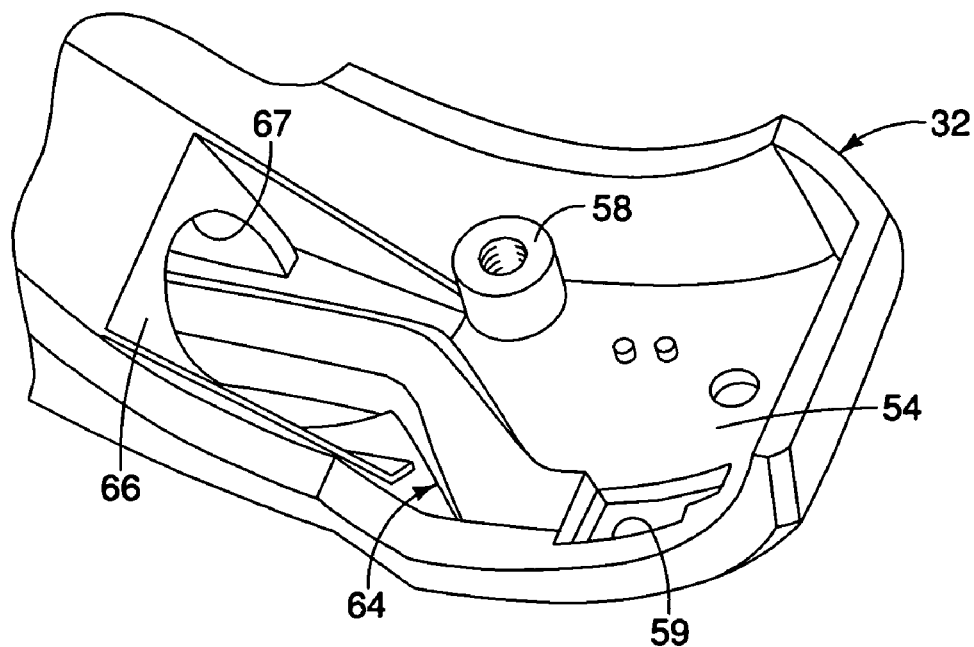
FIG. 10 is an enlarged, partial lower/side perspective view of the assembled cover member and reflector of FIGS. 8 and 9, with the light guide coupled thereto and the indicator lens cover partially coupled thereto.
Figure 11:
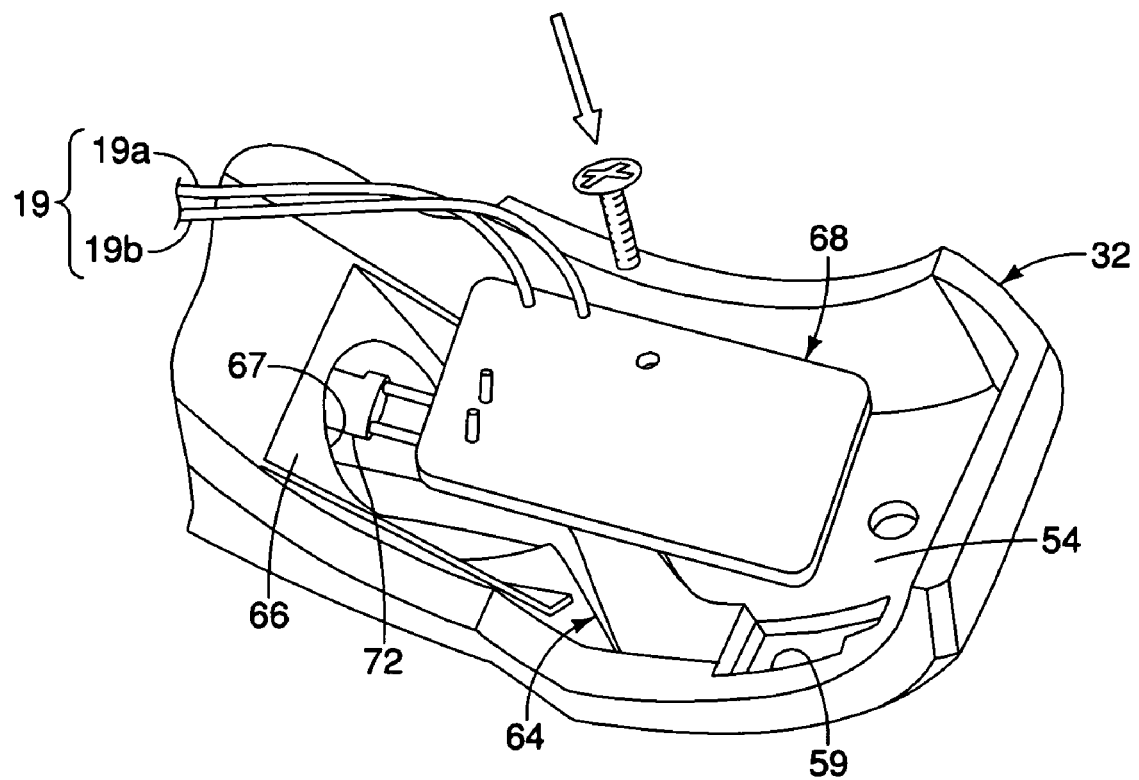
FIG. 11 is lower/side perspective view of the assembled structure of FIG. 10, with the printed circuit board partially coupled thereto.
Figure 12:
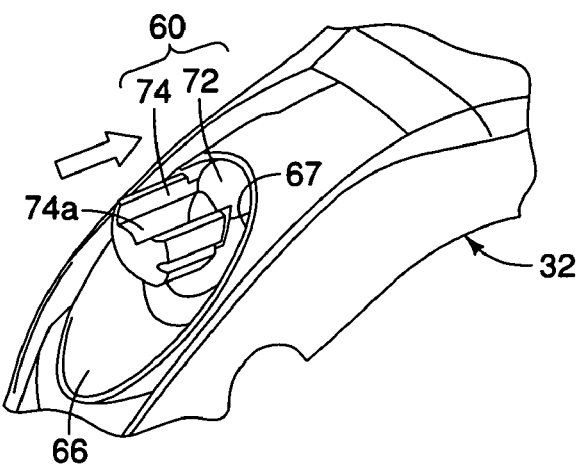
FIG. 12 is a partial front/side perspective view of the assembled structure of FIG. 11, with the LED lens partially coupled thereto.
Figure 13:
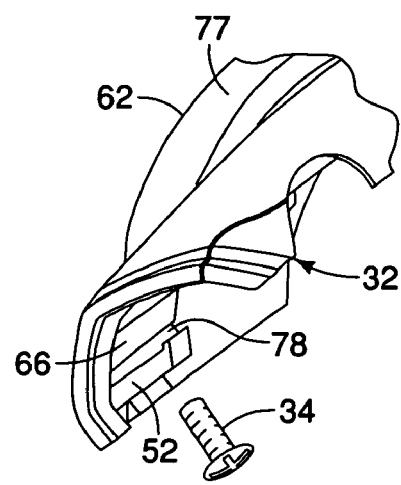
FIG. 13 is a partial lower/side perspective view of the assembled structure of FIG. 12, with the cover lens partially coupled thereto.

The light guide 64 basically includes a transmitting body portion 80 and a tubular coating portion 82, as best seen in FIG. 7. The light guide 64 is preferably snap-fitted or press fitted into a recess formed in an internal surface of the cover member 32 (only partially shown in FIGS. 10 and 11). Alternatively, the light guide 64 could be attached to the interior surface of the cover member 32 using adhesive. The printed circuit board 68 also serves to secure the light guide 64. Moreover, the fit and/or adhesive between the light guide 64, the LED lens 74 and the reflector 66 also serve to secure the light guide 64 in the proper location, as explained below.

As seen in FIGS. 4 and 7, the transmitting body portion 80 of the light guide 64 is basically constructed of a material that transmits light, while the tubular coating portion 82 is constructed of a material that prevents light from escaping from the transmitting body portion 80. The tubular coating portion 82 preferably includes an aluminum coating that completely surrounds the transmitting body portion 80 longitudinally except for a first end 84 of the light guide 64 and a second end 86 of the light guide 64 that are not coated with the light blocking/reflective coating as diagrammatically illustrated in FIG. 7. Thus, light from the LED 72 can enter the light transmitting body portion 80 through the first (open/non-coated) end 84 of the tubular coating portion 82 adjacent the LED 72, and light can exit the light transmitting body portion 80 through the second (open/non-coated) end 86 of the tubular coating portion 82 adjacent the gear position indicator 26.

Due to the arrangement of the transmitting body portion 80 and the tubular coating portion 82, the light guide 64 has an internal light channel (i.e., the light transmitting body portion 80) in optical communication with the bicycle location light 60 and the gear position indicator 26 with an external surface of the light guide 64 (i.e., the light transmitting body portion 80) having an aluminum coating (i.e., the tubular coating portion 82) to prevent light from escaping from the internal light channel. Accordingly, the light guide 64, which is disposed between the location light 60 and the gear position indicator 26, is configured and arranged to guide some of the light projected from the location light 60 internally toward the gear position indicator 26 in order to illuminate the gear position indicator 26 at a location remote from the light projecting outwardly from the shifter housing 20.

Preferably, the light transmitting portion 80 is constructed of a material that reflects light of a predetermined wavelength range and absorbs light of other wavelengths such that a different colored light than the light projected from the bicycle location light 60 illuminates the gear position indicator 26. For example, the transmitting body portion 80 can be constructed of a light transmitting material with an additive that absorbs light of wavelengths other than the predetermined wavelength range. Such techniques for achieving a certain color of light from white light are well known in physics, particularly optics, and materials science. In the illustrated embodiment, the light guide 64 is arranged and configured to transmit light with a predetermined wavelength to transmit an orange light. However, it will be apparent to those skilled in the art that other colors of light can be transmitted through the light guide 64 if needed and/or desired. In any case, preferably, the color of the light transmitted by the light guide 64 is different than the color of light projected outwardly of the shifter housing 20. Thus, the rider can quickly determine where to look for the gear position indicator 26 by simply looking for the different colored light.

The reflector 66 basically includes a through opening 67 and a plurality of reflective (e.g. mirrored) surfaces arranged and configured to reflect the light projected from the LED 72. The reflector 66 is preferably constructed of clear plastic having a plurality of reflective (e.g. mirrored) surfaces arranged and configured to reflect the light projected from the LED 72. Specifically, the reflector 66 is arranged and configured to reflect some of the light projected from the location light 60 (LED 72) outwardly from the shifter housing 20 as a beam of light and some of the light projected from the location light 60 in a different direction (i.e., inwardly or internally toward the light guide 64) in order to illuminate the gear position indicator 26 at a location remote from the light projecting outwardly from the shifter housing 20. Preferably, the reflector 66 is arranged and configured to reflect a majority of the light projected from the location light 60 outwardly from the shifter housing.

The LED 72, the LED lens 74 and one end of the light guide 64 are received in the through opening 67. Preferably the LED lens 74 and one end of the light guide 64 are retained in the through opening 67 by a friction or interference fit between these parts. Alternatively, a clear adhesive could be used between these parts and the through opening 67 to fixedly attach them together. The reflector 66 is supported at the front and rear by the front and rear of the mounting opening 50, and in the center by the reflector attachment portion 56. The reflector 66 preferably includes a pair of small projections that extend through the holes of the reflector attachment portion 56 that are used to ultrasonically weld the reflector 66 to the reflector attachment portion 56, as best understood from FIGS. 8 and 9.

The printed circuit board 68 is relatively conventional. Thus, the printed circuit board 68 will not be explained and/or illustrated in detail herein, except as needed to make and use the present invention. The printed circuit board 68 is electrically coupled to the hub dynamo HD of the front wheel 13a using the electrical cord 19 having at least two conductors 19a and 19b. The printed circuit board 68 basically includes various circuitry, microprocessor(s), resistor(s), capacitor(s), etc. The printed circuit board 68 in selected embodiments can have an internal rechargeable battery or a high capacity capacitor. The printed circuit board 68 is configured and arranged to provide an optimum range of electrical current output to the LED 72 using the electrical current inputted to the printed circuit board 68 from the hub dynamo HD. In other words, the printed circuit board 68 is configured and arranged to regulate the current received from the hub dynamo HD and outputted to the LED 72. The structure of the circuitry of the printed circuit board 68 will depend on the exact type and size of LED 72 utilized.

The indicator lens 70 is attached to the upper side of the cover member 32 to cover the indicator viewing opening 59. The indicator lens 70 is preferably constructed of clear plastic. The indicator lens 70 is preferably substantially larger than the indicator viewing opening 59 to substantially seal the indicator viewing opening 59 to prevent contaminants such as water or dirt from entering the interior of the shifter housing 20. The indicator lens 70 is preferably provided with a pair of small projections that extend through holes formed in the of the cover member 32 that are used to ultrasonically weld the indicator lens 70 to the cover member 32, as best understood from FIG. 10.

Referring still to FIGS. 3-14, the shift control mechanism 22 basically includes a take up member 90 with a cable attachment portion 92 and an indexing mechanism (not shown). The inner wire of the shift control cable 18 is coupled to the cable attachment portion 92 in a conventional manner to selectively wind/unwind (pull/release) the inner wire of the shift control cable 18 when the take up member 90 is rotated in opposite directions. The user operating member 28 is operatively coupled to the take-up member 90 in a conventional manner such that the take up member 90 rotates in response to rotation of the user operating member 28. Thus, the user operating member 28 is a rotatable hand grip (operating member) of the shift control mechanism 22 that is rotated in order to control shifting of the shift control mechanism 22 and movement of the mechanical gear position indicator 26. The shift control mechanism 22 is basically conventional. Accordingly, the shift control mechanism 22 will not be explained and/or illustrated in detail herein, except as needed to make and use the present invention. The shift control mechanism 22 can be understood from U.S. Patent Publication No. 2004/0139816.

Referring still to FIGS. 3-14, the gear position indicator 26 basically includes an indicator member 94 with gear position indicia 96 formed thereon/therein. The indicator member 94 rotates in response to movement of the user operating member 28 and movement of the shift control mechanism 22. Thus, the gear position indicator 26 is a mechanical indicator. The gear position indicia 96 correspond to different gear positions. The gear position indicia 96 are preferably constructed of a translucent material with a non-translucent material surrounding the gear position indicia 96. Thus, the gear position indicia 96 are illuminated by the light emitted from the light guide 64. However, only the element of the gear position indicia 96 (i.e., number 7 in FIG. 5) located directly below the second or output end 86 of the light guide 64 will be viewable through the indicator viewing opening 59 because the remaining elements of the gear position indicia will be hidden within the shifter housing 20. Also, the element of the gear position indicia 96 (i.e., number 7 in FIG. 5) located directly below the second or output end 86 of the light guide 64 will be illuminated due to the light structure 24. The manner in which the gear position indicator 26 is operated and moves are conventional. Thus, the gear position indicator 26 will not be explained and/or illustrated in detail herein, except as related to the present invention. The operation and movement of the gear position indicator 26 can be understood from U.S. Patent Publication No. 2004/0139816.

In the illustrated embodiment, the shift control device 12 is a rotatable hand grip type of shift control device with a rotatable, mechanical gear position indicator. While the present invention is particularly suited to such rotatable hand grip types of shift control devices, it will be apparent to those skilled in the art from this disclosure that the present invention could be applied to other types of shift control devices as needed and/or desired. For example, it will be apparent to those skilled in the art from this disclosure that the present invention could be applied to multiple lever shift control devices with various mechanical indicators if needed and/or desired.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. A bicycle shift control device comprising:
a shifter housing;
a shift control mechanism coupled to the shifter housing, the shift control mechanism being configured and arranged to control a bicycle transmission component; and
a bicycle light structure coupled to the shifter housing, the bicycle light structure including a bicycle location light, the bicycle light structure being arranged and configured such that the bicycle location light projects a majority of light projected by the bicycle location light outwardly from the shifter housing at a first location remote from a gear position indicator and projects a minority of light projected by the bicycle location light to illuminate the gear position indicator at a second location remote from the first location.

2. The bicycle shift control device according to claim 1, wherein
the bicycle location light includes an LED arranged and configured to project light outwardly from the shifter housing at the first location and to illuminate the gear position indicator at the second location.

3. The bicycle shift control device according to claim 1, wherein
the bicycle light structure includes a light guide disposed between the bicycle location light and the gear position indicator that is configured and arranged to guide the minority of light projected from the bicycle location light internally toward the gear position indicator in order to illuminate the gear position indicator at the second location remote from the first location.

4. The bicycle shift control device according to claim 3, wherein
the light guide is constructed of a material that reflects light of a predetermined wavelength range and absorbs light of other wavelengths such that a different colored light than the light projected from the bicycle location light illuminates the gear position indicator.

5. The bicycle shift control device according to claim 3, wherein the light guide has an internal light channel in optical communication with the bicycle location light and the gear position indicator with an external surface of the light guide having an aluminum coating to prevent light from escaping from the internal light channel.

6. The bicycle shift control device according to claim 3, wherein
the bicycle location light includes an LED arranged and configured to project light both outwardly from the shifter housing and internally toward the light guide.

7. The bicycle shift control device according to claim 3, wherein
the gear position indicator is a mechanical indicator that moves in response to movement of the shift control mechanism.

8. The bicycle shift control device according to claim 7, wherein
the shift control mechanism includes a rotatable hand grip that is rotated in order to control shifting of the shift control mechanism and movement of the mechanical gear position indicator.

9. The bicycle shift control device according to claim 7, wherein
the shift control mechanism is configured and arranged to move in order to selectively pull or release a shift control cable in response to movement of at least one actuating member.

10. The bicycle shift control device according to claim 3, wherein
the gear position indicator includes an indicator body having an opening formed therein to view the gear position indicator, and an indicator lens disposed to cover the opening of the indicator body.

11. The bicycle shift control device according to claim 1, wherein
the bicycle light structure includes a lens and a light guide, the lens being arranged and configured to project the majority of light projected by the bicycle location light and the light guide being configured and arranged to project the minority of light projected by the bicycle location light.

12. The bicycle shift control device according to claim 11, wherein
the bicycle location light includes an LED arranged and configured to project light outwardly from the shifter housing at the first location and to illuminate the gear position indicator at the second location.

13. The bicycle shift control device according to claim 12, wherein
the lens surrounds a majority of the LED and the light guide surrounds a minority of the LED.

14. The bicycle shift control device according to claim 11, wherein
the lens surrounds a majority of the bicycle location light and the light guide surrounds a minority of the bicycle location light.

15. The bicycle shift control device according to claim 11, wherein
the bicycle light structure includes a reflector arranged and configured to reflect the majority of light projected by the bicycle location light as a beam of light.

16. The bicycle shift control device according to claim 1, wherein
the bicycle light structure includes a reflector arranged and configured to reflect the majority of light projected by the bicycle location light as a beam of light.

* * * * *